United States Patent
Vaucher et al.

(10) Patent No.: US 8,159,174 B2
(45) Date of Patent: Apr. 17, 2012

(54) METHOD FOR ADAPTING CONTROLLER PARAMETERS OF A DRIVE TO DIFFERENT OPERATING STATES

(75) Inventors: Jean-Marc Vaucher, Couvet (CH); Pierre-Alain Burri, Le Locle (CH)

(73) Assignee: Etel S.A., Motiers (CH)

( * ) Notice: Subject to any disclaimer, the term of this patent is extended or adjusted under 35 U.S.C. 154(b) by 432 days.

(21) Appl. No.: 12/516,313

(22) PCT Filed: Oct. 17, 2007

(86) PCT No.: PCT/EP2007/008979
§ 371 (c)(1),
(2), (4) Date: Jun. 25, 2009

(87) PCT Pub. No.: WO2008/064740
PCT Pub. Date: Jun. 5, 2008

(65) Prior Publication Data
US 2010/0066296 A1    Mar. 18, 2010

(30) Foreign Application Priority Data
Dec. 2, 2006 (DE) .................. 10 2006 056 902

(51) Int. Cl.
*G05B 11/42* (2006.01)
(52) U.S. Cl. .................. 318/610; 318/561; 318/638
(58) Field of Classification Search ............ 318/610, 318/561, 638, 632, 609, 567, 400.11, 400.34, 318/362, 432; 701/68; 477/181; 360/75
See application file for complete search history.

(56) References Cited

U.S. PATENT DOCUMENTS

| 5,006,770 A | 4/1991 | Sakamoto et al. |
| 5,781,875 A | 7/1998 | Maki et al. |
| 2002/0144163 A1 | 10/2002 | Goodfellow et al. |
| 2009/0318265 A1 * | 12/2009 | Ginther ................ 477/181 |

FOREIGN PATENT DOCUMENTS

| EP | 0 728 929 | 8/1996 |
| WO | WO 92/14196 | 4/1991 |

OTHER PUBLICATIONS

International Search Report, PCT/EP2007/008979, dated Feb. 13, 2008.
Chin-Wen Chuang et al., "Applying experienced self-tuning PID control to position control of slider crank mechanisms," *International Symposium on Power Electronics, Electrical Drives, Automation and Motion*, 2006, pp. 652-657.
Written Opinion, PCT International Application No. PCT/EP2007/008979, dated Mar. 9, 2009 (not translated).

* cited by examiner

*Primary Examiner* — Karen Masih
(74) *Attorney, Agent, or Firm* — Kenyon & Kenyon LLP

(57) ABSTRACT

A method is provided for adapting controller parameters of a drive to different operating states. A control loop includes a PID controller whose I gain factor is adapted to a drive velocity and/or whose D gain factor is adapted to a drive current, and consequently to a drive load. The I gain factor is determined based on the drive velocity and the D gain factor is determined based on the drive current, in each case at least in one area, the I gain factor falling with the drive velocity and the D gain factor rising with the drive current.

12 Claims, 3 Drawing Sheets

METHOD FOR ADAPTING CONTROLLER PARAMETERS OF A DRIVE TO DIFFERENT OPERATING STATES

FIELD OF THE INVENTION

The present invention relates to a method for adapting controller parameters of a drive to different operating states. Such methods are used in the field of drive engineering to constantly obtain as optimal stability and control performance as possible, as independently of the specific operating state of the drive as possible.

BACKGROUND INFORMATION

In the field of control engineering, PID controllers are familiar as position controllers for the exact positioning with the aid of electrical drives. The parameterization of such PID controllers is sometimes not easy, especially when very different operating states occur. Operating-state-dependent behavior of the system to be controlled due to non-linearities makes it impossible to find a set of parameters which is optimal in every operating state with respect to the control performance and the stability of the complete controller structure.

Thus, saturation effects ensure that the bandwidth of a current controller is worse at high currents than at low currents. In addition, at particularly low velocities, stick-slip effects may occur in a system to be controlled, which play no role at higher velocities in whose range only sliding friction prevails.

It is conventional to adapt gain factors in control loops to different operating states. U.S. Pat. No. 5,006,770 describes a velocity controller having a PI structure, whose I gain factor is set to be inversely proportional to the specific velocity in order to compensate for stick-slip effects. However, such a PI structure is not well-suited as a position controller, and in addition, it is not possible to compensate for saturation effects.

SUMMARY

Example embodiments of the present invention provide a method for adapting controller parameters of a drive to different operating states, which permits as optimal control of the drive as possible, regardless of the operating state of the drive.

A method is described for adapting controller parameters of a drive to different operating states. The control loop of the drive includes a PID controller whose I gain factor is adapted to a drive velocity, and whose D gain factor is adapted to a drive current, and consequently to a drive load.

In a parameterization unit which is used to adapt the two gain factors in the PID controller, the drive velocity and the drive current pass through an absolute-value generator and a filter of the second order, before the absolute values thus formed are each assigned suitable gain factors in an assignment unit, and then used in the PID controller.

This method makes it possible to adapt the controller parameters to different operating states in terms of the drive velocity and the drive current.

According to example embodiments of the present invention, a method for adapting controller parameters of a drive to different operating states, a control loop of the drive including a PID controller having an I gain factor adapted to a drive velocity and a D gain factor adapted to a drive current and consequently to a drive load, includes: (a) determining the I gain factor based on the drive velocity, the I gain factor falling with the drive velocity; and (b) determining the D gain factor based on the drive current, the D gain factor rising with the drive current. The determining (b) includes: determining the D gain factor as a first D gain factor below a first limiting drive current; determining the D gain factor as a second D gain factor above a second limiting drive current, the second D gain factor greater than the first D gain factor; and determining a continuous transition between the first D gain factor and the second D gain factor between the first limiting drive current and the second limiting drive current.

Further features and details pertaining to example embodiments of the present invention are described below with reference to the Figures.

DETAILED DESCRIPTION

Figure 1:
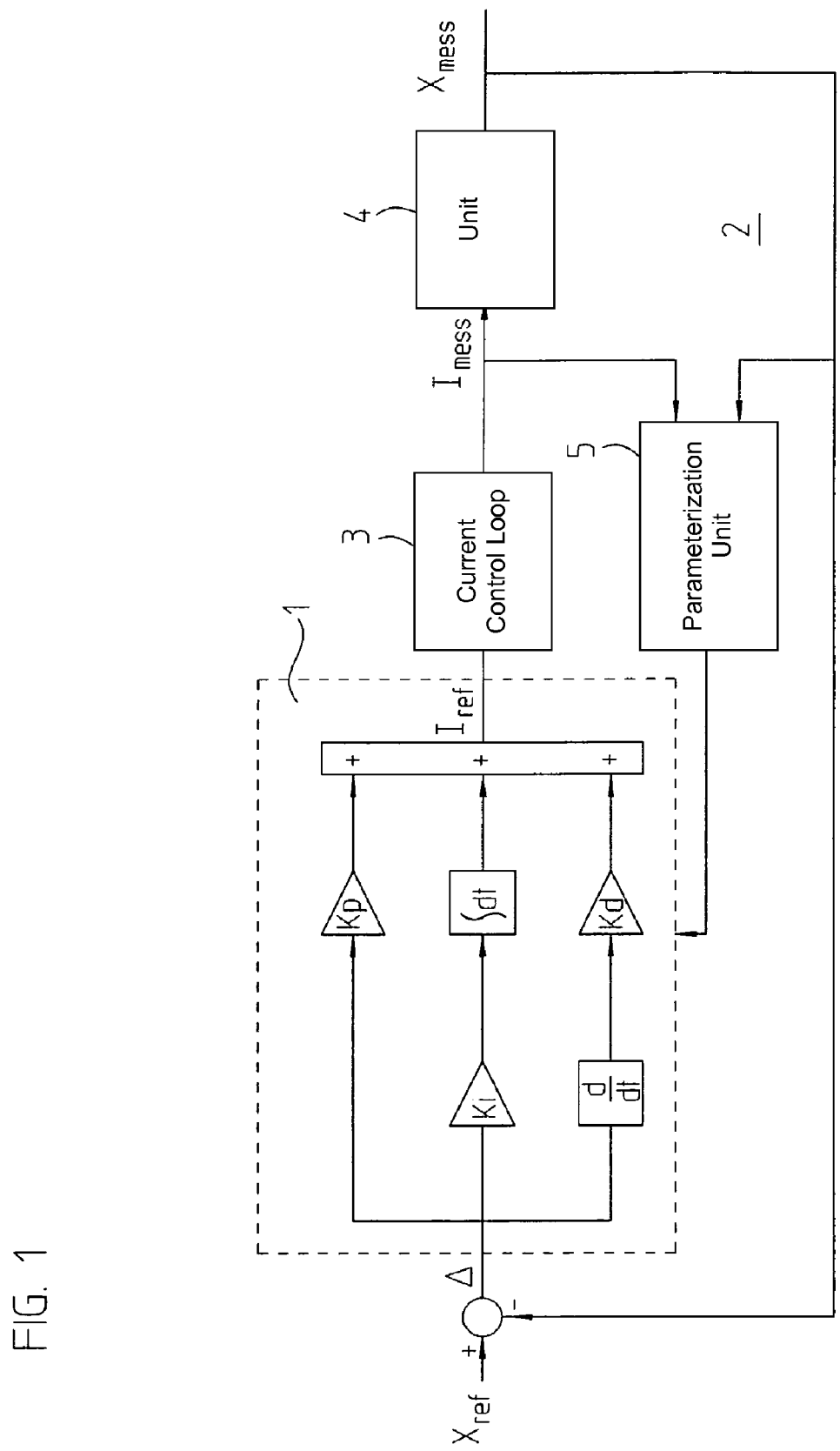
FIG. 1 shows a control loop having a PID controller.

FIG. 1 shows the circuit diagram of a drive solution having a control loop 2. It includes a position controller in the form of a PID controller 1, at whose input a positional deviation $\Delta$ Is applied, which is formed from the difference between a setpoint position value Xref and an actual position value Xmess. From positional deviation $\Delta$, PID controller 1 forms a setpoint current Iref which is fed to a current control loop 3. This current control loop 3 includes a current controller, a power amplifier operated according to the PWM method, a current-measuring device and the coils of a motor. Such current control loops are familiar from conventional systems. Current control loop 3 ensures that the current necessary to counteract positional deviation $\Delta$ flows in the motor. Unit 4 combines the mechanical system of the drive solution: In addition to the motor and a conversion mechanism such as a shaft, for example, unit 4 also includes a position valuator device, which outputs actual position value Xmess. This actual position value Xmess is fed back to the differentiator at the input of PID controller 1. Control loop 2 is thereby closed.

Drive current Imess (meant by this is the measured value which indicates the magnitude of the drive current) measured in current control loop 3 and actual position value Xmess are additionally supplied to a parameterization unit 5, whose task is explained in greater detail further below.

As customary, PID controller 1 is made up of a proportional P-branch which switches through the input of PID controller 1, multiplied by a P gain factor Kp, to the output of PID controller 1, an I-branch integrating over time, which switches through the input, multiplied by an gain factor Ki and integrated over time, to the output, as well as a deriving D-branch, which switches through the input, derived over time and multiplied by a D gain factor Kd, to the output. The output of PID controller 1 is therefore formed from the sum of the P-branch, I-branch and D-branch.

Hereinafter, the three gain factors indicated are also denoted as Kp, Ki and Kd for short.

Figure 2:
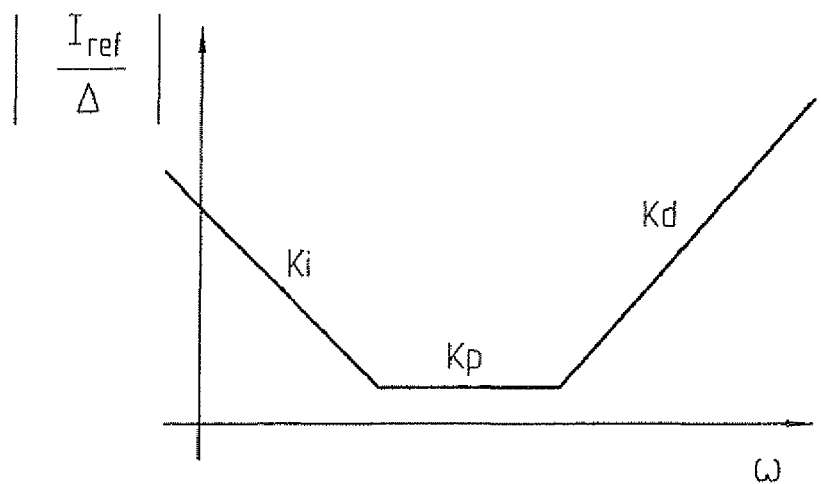
FIG. 2 shows the transfer function of the PID controller.

FIG. 2 shows the transfer function of PID controller 1 as a Bode diagram. The following applies:

$$PID(j\omega)=Iref(j\omega)/\Delta(j\omega)=Ki*1/j\omega+Kp+Kd*j\omega$$

Consequently, PID(jω) is approximately equal to Ki*1/jω for small frequencies ω, and approximately equal to Kd*jω for large frequencies ω.

Since the mechanical transfer function of control loop 2 shows a velocity dependency precisely in the area in which PID(jω) is approximately equal to Ki*1/jω, and current control loop 3 has a load dependency precisely in the area in which PID(jω) is approximately equal to Kd*jω, it is provided to compensate for these two non-linearities by a velocity-dependent or load-dependent adaptation of Kd and Ki.

Kd and Ki are adapted by parameterization unit 5 already mentioned above. Such a parameterization unit 5 may be provided in hardware or—like the entire controller structure—may be mapped in software. Parameterization unit 5 has the task of deriving suitable gain factors Kd and Ki for PID controller 1 from velocity v of the drive and drive current Imess measured in the drive. To that end, in the present exemplary embodiment, first of all a drive velocity v must be derived from the change in actual position value Xmess over time, since drive velocity v is not measured directly. If the state variables velocity v and measured drive current Imess are present, Ki and Kd are derived according to FIG. 3.

Figure 3:
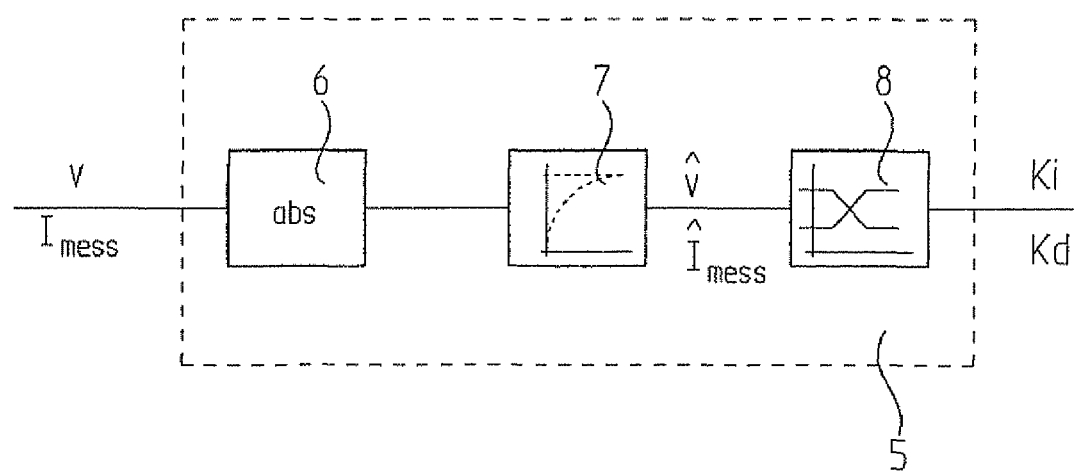
FIG. 3 shows components of the parameterization unit.

According to FIG. 3, in parameterization unit 5, state variables v and Imess are initially each conducted through an absolute-value generator 6, in order to form their absolute values. Namely, the preceding sign of respective state variable v, Imess plays no role either for the stick-slip effects or for the saturation effects. Ki and Kd are therefore determined independently of such a sign. Both state variables v, Imess are then each filtered by a second-order filter 7. Such a filter 7 has the task of time-delaying very rapid changes in the respective state variable, in order to ultimately avoid too rapid a change in gain factors Kd, Ki. This pretreatment of state variables v and Imess is advantageous, but not absolutely necessary.

The state variables thus prepared, which hereinafter are also denoted as v' and I'mess, are then each fed to an assignment unit 8, which assigns a gain factor Ki, Kd to respective state variable v', I'mess. This gain factor Ki, Kd is then used in PID controller 1.

Figure 4:
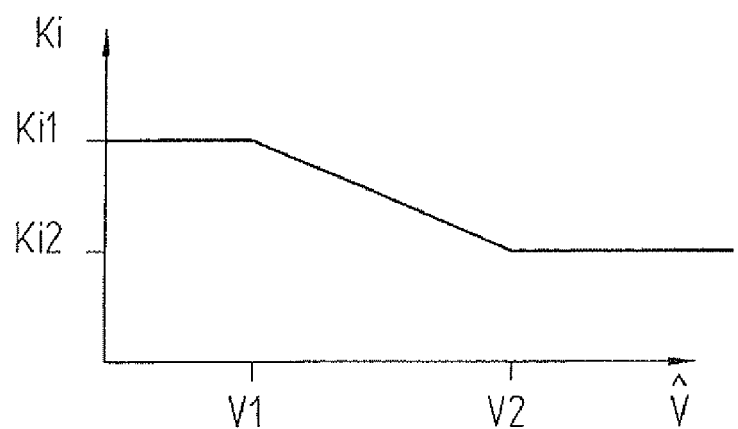
FIG. 4 shows the dependency of the I gain factor on the drive velocity.

FIG. 4 shows an example for the assignment of a value for Ki as a function of drive velocity v', as it may be used in assignment unit 8 for Ki. Below a first limit velocity v1, a first I gain factor Ki1 is determined; above a second limit velocity v2, a second I gain factor Ki2 is determined. In this context, Ki2 is smaller than Ki1. Between the two limit velocities v1 and v2, a continuous, preferably linear transition is determined. In this area, Ki falls with drive velocity v'.

A linear interpolation between value pairs v1, Ki1 and v2, Ki2 may be calculated particularly easily. Alternatively, for the transition it is also possible to use greatly differing mathematical functions which define a continuous transition from Ki1 to Ki2.

Figure 5:
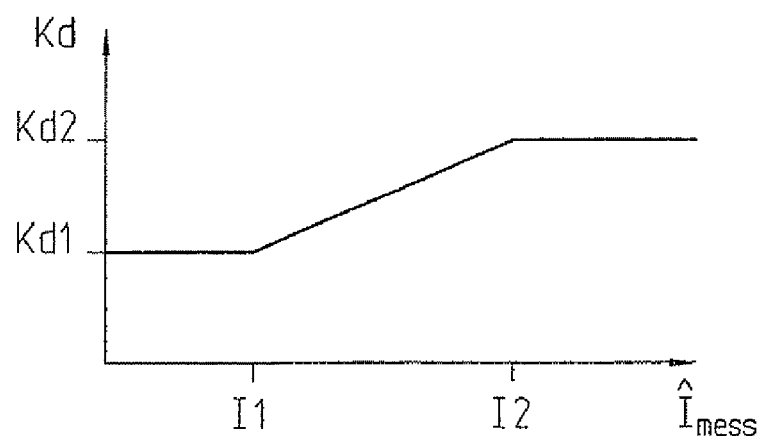
FIG. 5 shows the dependency of the D gain factor on the drive current.

FIG. 5 shows an example for the assignment of a value for Kd as a function of drive current I'mess, as it may be used in assignment unit 8 for Kd. An important difference compared to FIG. 4 is that, below first limiting drive current I1, Kd is smaller than above second limiting drive current I2. The transition between the two limiting drive currents I1, I2 is again continuous and preferably linear. In this area, Kd rises with drive current I'mess.

Its numerical values are indicated merely by way of example:

$$v1=2\ \mu m/s,\ Ki1=300,\ v2=20\ \mu m/s,\ Ki2=200$$

$$I1=1.8\ A,\ Kd1=1250,\ I2=2.4\ A,\ Kd2=2000$$

The practical realization of assignment unit 8 may also be accomplished via look-up tables for Ki and Kd, in which suitable gain factors Ki and Kd, respectively, are entered for a number of velocities v, v' and drive currents Imess, I'mess. Intermediate values may be interpolated if necessary.

The method described above for adapting controller parameters Kd, Ki is considered to be best in the interaction of linear or rotary direct drives with the controller structure shown in FIG. 1. Both in the area of low velocities and in the area of high load or high drive currents, significant improvements are yielded in the bandwidth and control performance. Depending on the specific application, it may also be sufficient to adapt only one of the two gain factors Ki, Kd as described above.

What is claimed is:

1. A method for adapting controller parameters of a drive to different operating states, a control loop of the drive including a PID controller having an I gain factor adapted to a drive velocity and a D gain factor adapted to a drive current and consequently to a drive load, comprising:
   (a) determining the I gain factor based on the drive velocity, the I gain factor falling with the drive velocity; and
   (b) determining the D gain factor based on the drive current, the D gain factor rising with the drive current;
   wherein the determining (b) includes:
      determining the D gain factor as a first D gain factor below a first limiting drive current;
      determining the D gain factor as a second D gain factor above a second limiting drive current, the second D gain factor greater than the first D gain factor; and
      determining a continuous transition between the first D gain factor and the second D gain factor between the first limiting drive current and the second limiting drive current.

2. The method according to claim 1, wherein the continuous transition is a linear transition.

3. The method according to claim 1, wherein the I gain factor is determined in the determining (a) in accordance with an absolute value of the drive velocity.

4. The method according to claim 1, wherein the D gain factor is determined in the determining (b) in accordance with an absolute value of the drive current.

5. The method according to claim 1, further comprising filtering the drive velocity and the drive current through a second-order filter.

6. The method according to claim 1, further comprising filtering the drive velocity and the drive current through a second-order filter to time-delay rapid changes.

7. The method according to claim 1, wherein the determining (a) includes:
   determining a first I gain factor below a first limit velocity;
   determining a second I gain factor above a second limit velocity, the second I gain factor smaller than the first I gain factor; and
   determining a continuous transition between the first I gain factor and the second I gain factor between the first limit velocity and the second limit velocity.

8. The method according to claim 7, wherein the continuous transition between the first I gain factor and the second I gain factor is a linear transition.

9. The method according to claim 1, wherein the I gain factor is determined in the determining (a) and the D gain factor is determined in the determining (b) in an assignment unit in accordance with look-up tables.

10. The method according to claim 1, wherein the I gain factor is determined in the determining (a) and the D gain factor is determined in the determining (b) in an assignment unit in accordance with mathematical functions.

11. The method according to claim 1, wherein the PID controller is arranged as a position controller adapted to form, from a positional deviation, a setpoint current suppliable to a current controller.

12. The method according to claim 11, wherein the PID controller is arranged as a position controller, the method further comprising:

forming, from a positional deviation, a setpoint current; and supplying the setpoint current to a current controller.

* * * * *